United States Patent [19]

Allen

[11] Patent Number: 4,868,013

[45] Date of Patent: * Sep. 19, 1989

[54] FLUIDIZED BED PROCESS

[75] Inventor: Robert H. Allen, Baton Rouge, La.

[73] Assignee: Ethyl Corporation, Richmond, Va.

[ * ] Notice: The portion of the term of this patent subsequent to May 31, 2005 has been disclaimed.

[21] Appl. No.: 165,187

[22] Filed: Mar. 7, 1988

Related U.S. Application Data

[63] Continuation-in-part of Ser. No. 88,145, Aug. 21, 1987, Pat. No. 4,748,052.

[51] Int. Cl.[4] ...................... C01B 33/02; B05D 7/00; C23C 16/00
[52] U.S. Cl. .................................... 427/213; 118/716; 118/DIG. 5; 423/349; 423/350; 427/215; 427/248.1
[58] Field of Search ..................... 427/213, 215, 248.1; 118/716, DIG. 5; 423/348, 349, 350

[56] References Cited

U.S. PATENT DOCUMENTS

| | | | |
|---|---|---|---|
| 3,963,838 | 6/1976 | Setty et al. | 427/213 |
| 4,154,870 | 5/1979 | Wakefield | 427/8 |
| 4,207,360 | 6/1980 | Padovani | 427/213 |
| 4,292,344 | 9/1981 | McHale | 427/45.1 |
| 4,416,913 | 11/1983 | Ingle et al. | 427/45.1 |
| 4,642,228 | 2/1987 | Sanjurjo et al. | 423/350 |
| 4,748,052 | 5/1988 | Allen | 427/213 |

OTHER PUBLICATIONS

Eversteijn, *Phillips Res. Repts.*, 26, 134–144 (1971).
Hsu et al., *Eighteenth IEEE Photovoltaic Specialists Conference* (1984), pp. 553–557.

Primary Examiner—John Doll
Assistant Examiner—Lori S. Freeman
Attorney, Agent, or Firm—P. M. Pippenger

[57] ABSTRACT

Undesirable conversion of a silicon source, such as silane, in the freeboard above a fluidized bed of silicon particles in a fluidized bed reactor, can be reduced by cooling the gas within the freeboard. Preferably, the reduction in temperature is achieved by introducing into the freeboard, a stream of relatively cool quench gas such as hydrogen, which also reduces the concentration of silane in the freeboard. As a result of these two factors, the invention improves the service factor of the fluidized bed apparatus, and reduces the amount of silane conversion to undesired by-products.

13 Claims, 1 Drawing Sheet

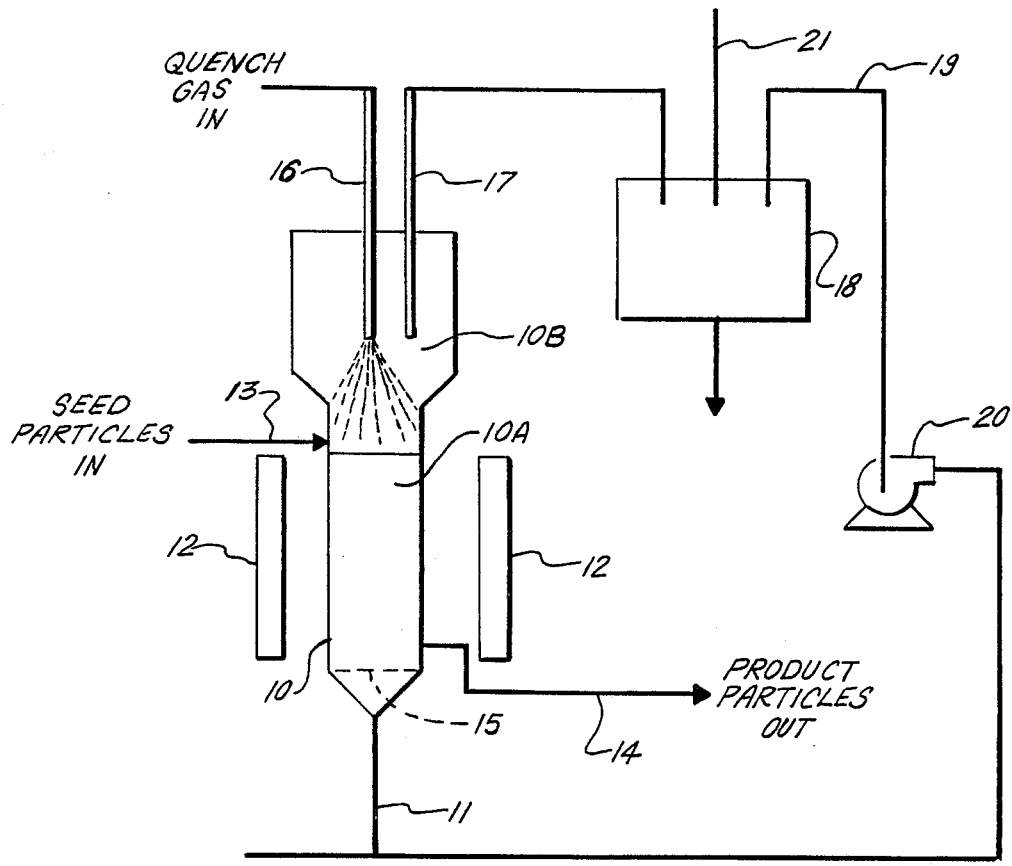

FLUIDIZED BED PROCESS

CROSS-REFERENCE TO RELATED APPLICATIONS

This application is a continuation-in-part of application Ser. No. 88,145 now U.S. Pat. No. 4,748,052 filed Aug. 21, 1987, for Fluid Bed Reactor and Process. Reference is also made to application Ser. No. 4,116 filed Jan. 16, 1987, for Polysilicon Produced by a Fluid Bed Process, and now U.S. Pat. No. 4,784,840 filed Oct. 28, 1987, for Fluid Bed Process and Product.

FIELD OF THE INVENTION

This invention relates to an improved use of fluidized bed reactors. In a more particular aspect, it relates to the production of polysilicon utilizing a fluidized bed process. In a preferred embodiment, this invention relates to a process for producing polysilicon in which silane is thermally decomposed to deposit silicon on silicon particles in a fluidized bed.

DESCRIPTION OF RELATED ART

It is known in the art that the fluidized bed reactor offers many advantages for chemical vapor depositions. For example, the fluidized bed provides improved energy utilization and material economy; confer Wakefield, U.S. Pat. No. 4,154,870. As pointed out in that reference, continuity of operation, the large surface area of the fluidized particles, and the high exposure of solid surfaces to the gas stream, all provide economy of operation.

McHale, U.S. Pat. No. 4,292,344, pertains to production of polycrystalline silicon by decomposition of silane, or a halosilane, in a fluidized bed. It teaches that process conditions are preferably maintained so that decomposition of the silicon compound occurs in a heterogeneous manner; i.e. so that silicon is deposited on the surface of particles in the bed. However the reference points out that in conventional reactors, homogeneous decomposition of silane also takes place, resulting in the formation of fine silicon powder or dust. This material is a light, fluffy powder and is usually undesirable since it is difficult to handle.

Eversteijn, *Philips Res. Repts.* 26, 134–144, (1971) comprises a study of gas phase decomposition of silane in a horizontal epitaxial reactor. It was found that gas phase decomposition is a serious factor that must be taken into account. In order to avoid gas phase decomposition, the maximum silane concentration in the hydrogen admitted to the reactor was 0.12–0.14 volume percent, depending on the gas temperature. When this critical silane concentration was exceeded, gas phase decomposition occurred giving rise to silicon fines which deposited on the substrate.

Another article, Hsu et al, *Eighteenth IEEE Photovoltaic Specialists Conference* (1984) pp. 553–557, discusses additional studies on fines formation. It states that silane pyrolysis in a fluidized bed reactor can be described by a six-path process: heterogeneous deposition, homogeneous decomposition, coalescence, coagulation, scavenging, and heterogeneous growth on fines. The article indicates that fines formation can be reduced by providing at a suitable bed location, a secondary source of silane for cementation.

The cited art clearly shows that production of silicon via decomposition of silane is complicated, and that provision of improved processes is not straightforward. Nonetheless, because of continuing advances in the electronics industry and the development of new products in that field, improvements in existing technology are needed to provide high purity silicon at reduced cost. This invention, which enhances operation of fluidized bed methods by providing means to make high quality product under high productivity operating conditions, satisfies that need.

Most research on fluidized bed decomposition of silane has been conducted using small reactors, i.e. reactors having two, three, six inch, or similar internal diameters. Bubbles of deposition gas (e.g. silane and hydrogen) which form in the fluidized bed, tend to grow and reach the reactor diameter near the bottom of these reactors, and then ascend in plug flow. Therefore, the silane in the bubble phase can effectively transfer to the emulsion phase (at or near the surface of bed particles) and react, to deposit silicon on particle surfaces. Consequently, in small reactors high silane conversions can be achieved using bed temperatures of 620°–650° C.

However, as reactor diameter increases (to diameters of twenty inches to 2.5 feet or so) the bubbles tend to become larger, and to move faster through the bed. For example, in a reactor having a diameter greater than 2.5 feet, maximum bubble size may be in the order of 22–24 inches in diameter, and such bubbles may never touch and drag on the walls of a reactor. Therefore, in large reactors, bubbles of deposition gas begin to bypass bed particles, and consequently more silane stays within the bubble phase and enters the reactor freeboard. Hence, in large reactors, it is desirable to minimize unwanted silane reaction in the freeboard, and to recover the silane values for recycle. This invention provides a method for achieving these results.

SUMMARY OF THIS INVENTION

This invention relates to two improvements in a fluidized bed apparatus and processes. First, this invention improves the service factor for polysilicon fluidized beds by lessening deposition on the walls of the reactor freeboard. This invention also improves the yield of polysilicon product by lowering the amount of conversion of silane to silicon dust. In a preferred embodiment, it relates to increasing the service factor of polysilicon fluidized bed reactors by quenching the silane decomposition reaction in the reactor freeboard. (The freeboard region of a fluidized bed reactor is that space above the bed that is needed to separate particles from the motive gas stream.)

As taught by the prior art, there are two competitive mechanisms involved in the decomposition of silane:

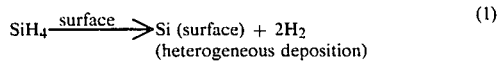
(1)
(heterogeneous deposition)

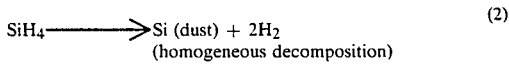
(2)
(homogeneous decomposition)

To produce polysilicon, i.e. useful product, silane is decomposed according to mechanism (1). Dust produced by mechanism (2) has no known uses, and therefore is considered a loss in the process.

Generally speaking, decomposition by both mechanisms will simultaneously occur. However, as recognized in the art, reaction conditions can be selected so that one mechanism predominates over the other. Thus, in a fluidized bed process for preparing polysilicon, the preferred operating conditions favor heterogeneous deposition of silicon. These conditions increase the yield of desired product.

In order to achieve higher yields of silane, an operator can conduct a fluidized bed process using conditions which result in less than all of the silane introduced into the reactor being decomposed in the fluidized bed. Under such conditions, silane in a carrier gas exits the bed and enters the freeboard. There is a tendency for the silane in the freeboard to decompose to additional dust particles, or to deposit silicon metal on dust particles or on the reactor walls. This causes silane gas to be converted in a manner which does not lead to useful product, and it also causes other problems.

With regard to these problems, not all silicon dust produced escapes from the reactor to be accumulated in collection device(s) downstream. Some of it accumulates on the walls of the reactor above the fluidized bed. Accumulated dust particles on the reactor walls become cemented together by deposition of silicon thereon, via mechanism (1) above. This is an acute problem because the unwanted growths constrict the reactor gas outlet, and thereby limit the service factor of the reaction unit by requiring downtime to remove the growths from the vessel walls.

Furthermore, these cemented growths can fall off the walls into the fluidized bed. They work their way down to near the bottom of the bed, and cause pluggage of the product withdrawal system (and consequently, more downtime to remove the pluggage).

Downtime to remove pluggage and/or gas outlet constriction can be significant. Fluidized bed reactors for preparing silicon from silane are operated at temperatures above the decomposition temperature of silane (about 500° C.). Frequently, they are operated at temperatures between 600° and 700° C. Fluidized bed reactors (larger than laboratory scale) for the production of polysilicon at these temperatures, are large heat sinks. Consequently, for even a pilot plant scale unit, it can take many hours to merely cool the unit from operating temperature to a low enough temperature sufficient to allow operator(s) to remove the unwanted, spalled or attached growths, and then reheat the unit back to operating temperature. This prolonged downtime period has a highly deleterious effect on process economics.

This invention relates to process and apparatus improvements which retard the undesirable conversion of silane or other silicon source in the freeboard. The invention comprises means to quickly reduce (quench) the gas temperature as the gas exits the bed and enters the freeboard. In a preferred embodiment, this is accomplished by mixing the bed effluent with hydrogen gas (quench gas) at a sufficiently cool temperature. The result is an improved product yield with a highly significant decrease in wall growths in the reactor.

The quench gas utilized in the present invention dilutes the concentration of silane in the reactor freeboard, and lowers the temperature of gases present there. Although not bound by any theory, the beneficial results of this invention appear to arise by both of these mechanisms. Reduction in temperature, and reduction in concentration both reduce the rate of silane decomposition and/or deposition.

For deposition of silicon on a freeboard wall, the wall must be hot, i.e. above the silane decomposition temperature. Under normal operating conditions, walls of the freeboard can approach or even exceed the temperature of the particle bed. Freeboard walls near the external heating means and just above the bed, may be hotter than particles within the bed.

Freeboard wall temperatures are affected by (i) heat from the external heating means, (ii) radiation of heat from the bed particles to the walls, and (iii) conduction of heat upward through the wall itself. Thus, even if gases in a freeboard are relatively cool, the temperature of the wall may exceed the silane decomposition temperature, at least at some locations. Thus, silane deposition, which may include cementing of dust particles to the wall surface, can occur. Therefore, an advantage of the cold quench gas and the mixing and turbulence in the freeboard that results from use of quench gas, is the beneficial cooling effect obtained on the interior surface of the walls of the freeboard. Such cooling helps to minimize the formation of unwanted growths on freeboard walls.

Generally speaking, the colder the mixed gases and the greater the turbulence caused by introduction of cool quench gas, the greater the wall cooling effect. Freeboard wall cooling by use of quench gas is believed to be more beneficial than attempts to cool the walls from outside (say by use of a water jacket). As a layer of silicon builds up on the inside of a wall that is cooled by external cooling means, the layer acts as a better insulator, and the cooling from the outside cooler becomes less effective, until it finally becomes essentially useless.

DESCRIPTION OF THE DRAWING

The FIGURE is a schematic drawing, not to scale, showing a fluidized bed reactor of this invention, and related equipment for use in carrying out the inventive process provided herein.

DESCRIPTION OF PREFERRED EMBODIMENTS

This invention relates to an apparatus and a method for reducing the amount of conversion of a silicon source in the freeboard above a fluidized bed of silicon particles utilized in a fluidized bed process for preparing polysilicon.

In one embodiment, this invention relates to a method for reducing the amount of undesirable conversion of silane (or other gaseous or vaporous silicon source) in the freeboard above a bed of silicon particles utilized in a fluidized bed process for producing polysilicon. In the process, the silicon source is thermally decomposed to deposit silicon metal on silicon particles in the fluidized bed. The method of this invention comprises introducing, into the freeboard above the fluidized bed a quench gas at a temperature below the decomposition temperature of the silicon source, the amount of quench gas being sufficient to significantly reduce the temperature of gas in the freeboard. The method results in reduction of the rate of decomposition of the silicon source, and a reduction in the amount of thermal decomposition of said silicon source in the freeboard. The method conserves the silicon source and increases the yield of useful product.

With regard to process, this invention comprises a fluidized bed method for the preparation of polysilicon, said process comprising, (i) fluidizing a bed of silicon particles, within a reactor having a bed zone for said particles and a freeboard above said bed zone, with a motive stream of deposition gas comprising a silicon source, said bed zone being at a temperature above the thermal decomposition temperature of said silicon source, whereby a portion of said silicon source is decomposed in said bed zone to deposit silicon metal on said bed of silicon particles, and a remaining portion of said silicon source exits said bed zone and enters said freeboard, and (ii) introducing a flow of relatively cool quench gas into said freeboard above the upper boundary of said bed zone, said flow of quench gas being sufficient to reduce the temperature and concentration of said silicon source in said freeboard, and thereby reduce the amount of decomposition of said silicon source in said freeboard.

In another embodiment this invention relates to a fluidized bed apparatus for preparing polysilicon comprising a bed of silicon particles enclosed within a reactor having a bed zone and a freeboard above said bed zone; means for heating said bed zone to a temperature above the decomposition temperature of a gaseous or vaporous silicon source in a deposition gas; gas inlet means for introducing a motive stream of said deposition gas comprising a silicon source, and optionally a carrier gas into said reactor; distribution means beneath said particle bed having a multiple number of conduits permitting the flow of said deposition gas therethrough, and into said bed of particles with sufficient motive force to maintain said particles in fluidized suspension within said reactor bed zone; gas outlet means near the upper limit of said reactor freeboard for removing gas exiting the reactor; and quench gas introducing means for introducing a flow of relatively cool quench gas into said freeboard above the upper boundary of said bed zone, said flow of quench gas being sufficient to reduce the temperature of said silicon source and carrier gas in said freeboard, and thereby reduce the rate of decomposition of said silicon source and thereby reduce the amount of conversion of said silicon source in said freeboard.

Silane, for many reasons is an efficacious source of silicon for a fluidized bed, silicon-forming process. Accordingly, silane is a preferred silicon source for use with this invention. However, it will be readily understood by a skilled practitioner that this invention can be applied to reduction in unwanted conversion of alternative silicon sources having the formula $SiH_aX^1_bX^2_c$ where $X^1$ and $X^2$ are halogen, selected preferably from F, Cl, and Br, and a, b, c are integers equal to 0–4, such that the sum of $a+b+c=4$. Examples of such materials are silane, monochlorosilane, dichlorosilane, trichlorosilane and tetrachlorosilane. Other materials include $SiH_2BrCl$, $SiHCl_2Br$, $SiHFClBr$, and the like. Of these, silane and the chlorinated silanes are preferred, with silane being highly preferred.

At this juncture, description of the invention will be assisted by referring to the drawing. As shown, this invention comprises use of a fluidized bed reactor 10. A flow of deposition gas, e.g. silane and hydrogen, is admitted to the reactor through inlet line 11. The reactor is surrounded by heater 12 shown in partial cross section. The heater supplies enough heat to reactor 10 to enable the process to be conducted at the desired process temperature, which is above the decomposition temperature of silane. Reactor 10 is fitted with seed particle inlet 13 for introducing polysilicon seed particles into the reactor. It is also fitted with product takeout line 14 for removal of polysilicon product. Deposition gas entering reactor 10 through line 11, flows through distributor plate 15, which is supplied with a plurality of holes of sufficient size to allow entry of gas at the desired rate. When the gas enters at the desired rate, the motive force is sufficient to maintain the polysilicon particles in suspension in zone 10A.

Above bed zone 10A is freeboard 10B. Particles from the bed that are propelled into the freeboard decelerate there, and fall back into the bed. The height of the freeboard permits this deceleration to take place.

Effluent gas leaves the reactor through line 17, and is transported to collection device 18. The effluent gas contains unreacted silane, carrier gas, by-product hydrogen, and silicon dust or fines formed during the process. This invention provides means for reducing the amount of silane conversion in the freeboard.

For this invention quench gas, e.g. hydrogen, is introduced into reactor freeboard 10B through line 16. The temperature of the quench gas is comparatively cool compared to the temperature of the effluent gas exiting zone 10B. More preferably, the temperature and the amount of quench gas is sufficient to rapidly reduce the temperature of the effluent gas to a temperature substantially below the temperature of deposition gas passing through zone 10A. Preferably, the temperature of the quench gas is at or about ambient temperature. When silane is used as a silicon source, good results are achieved if the amount of quench gas is sufficient to reduce the temperature of gas in the freeboard to 400° C., or below.

When quench gas emerges as a jet from the terminus of line 16, it entrains the surrounding gas and expands. The momentum of the jet is transferred to the surrounding fluid that is entrained. The momentum transfer is due to turbulence and static-pressure gradients across the jet.

In the freeboard below the orifice of line 16, the quench gas jet can be considered to have four regions.
  (1) A short region of flow establishment (the length is about 5 nozzle diameters,
  (2) A transition region of about 8 nozzle diameters,
  (3) A region of established flow (the principal region of the jet) extending to about 1000 nozzle diameters, and
  (4) A terminal region where the reduced maximum velocity falls off sharply.

Within the jet, especially in region 3, the gases of the freeboard and the quench gas become mixed together and as a result the freeboard gas becomes cooled. The cooled gas tends to cool the wall of the freeboard and dust particles in the freeboard. Therefore, the rates of silane decomposition in the freeboard space and at the freeboard walls both become reduced.

The quench gas is introduced into the freeboard such that the flow of quench gas affords good mixing with other gases in the freeboard. The flow of gas from the jet to the upper limit of the silicon particles in the fluidized bed should not be so high as to cause undesirable heat loss from the bed. Therefore, the quench nozzle is preferably positioned so that most if not all of the energy of the jet is depleted as it nears the bed surface.

Fines or dust entrained in the gaseous effluent in line 17 are separated in collection device 18. Hydrogen from the collection device can be recycled via line 19, pump 20, and a heat exchanger (not shown) back into the reactor as carrier gas. The process of this invention is a net producer of hydrogen, and therefore, a proportion of hydrogen from device 18 can be sent via line 11 to other uses, not part of this invention.

Before introduction into reactor 10, the hydrogen and silane are admixed and adjusted to desired concentrations by passage through metering and monitoring devices (not shown). After admixture, the resultant gas mixture enters the reactor device below distributor 15 via line 11. The incoming gas or the carrier gas may be preheated, if desired. To prevent fouling and plugging, distributor 15 may be fitted with cooling means, (not shown).

It is to be understood that the process of this invention is not critically dependent on the size or configuration of the fluidized bed reactor. For example, in contrast to the device shown in FIG. 1, the feed silicon seed particles can be added near the bottom of the reactor, and product taken off near the top. Moreover, the reactor can be short or tall, and the process conditions adjusted in order to make satisfactory product in an efficacious manner.

Similarly, it is readily apparent to a skilled practitioner that the size of the particles in the fluidized bed, the bed height, gas bubble size in the bed, the gas velocity, temperature, pressure and composition, and the size and configuration of the reaction zone, are important variables, but they are not a part of the essence of the invention disclosed herein.

For purposes of illustration, when silane is used as a silicon source, the temperature of deposition gas within the bed can be in the preferred range of 620° to 650° C. Higher temperatures are employed with other silicon sources. The deposition gas can contain silane admixed with hydrogen, or other inert substance, e.g. helium or neon as a carrier gas. Preferably, the silane concentration is from about 1 to about 20 mole percent.

The deposition gas is introduced into the reactor at a flow rate sufficient to maintain the bed of silicon particles in fluidized suspension. Preferably $U/U_{min}$ is 1.5 to 3.5, greater or lesser velocities, e.g. $1.2 < U/U_{min} < 8$ can be used. The deposition gas introduced into the reactor can be at a slight positive pressure in order to facilitate fluid flow. Thus, the pressure can be 1.01 to 2 atmospheres.

The process of this invention is conducted using a fluidized bed of silicon particles. These particles are of sufficient purity to be acceptable for the use intended. The seed particles used to prepare particles in the bed can be prepared by this invention followed by reducing particle size to an average of 200 microns with an 80–400 microns range. Seed particles can be irregular in shape. They tend to become substantially spherical during operation of the reactor. Preferably the bed particles after silicon deposition have a $d_{ps}$ of 400–1000 microns, more preferably from about 600 to about 800 microns. However, beds having a $d_{ps}$ of 300–2000 microns can be used. The average particle size and the size range is not critical, so long as the bed can be fluidized under acceptable operating conditions.

As discussed and illustrated elsewhere in this application, this invention comprises adding a comparatively cool quench gas to the reactor freeboard. The quench gas mixes with the gas exiting the silicon bed and lowers its temperature. By lowering the temperature of the exiting gas, the quench gas lowers the rate of decomposition of silane in the exiting gas, thereby reducing the conversion of silane in the freeboard to undesired product(s). Quench gas at or near ambient temperature can be used. When introduced into the freeboard at a reasonable flow rate as a jet, quench gas at such temperatures can quickly lower the temperature of gas in the freeboard to below the silane decomposition temperature. Thus, quench gas temperatures of from about 15° to about 35° C. are preferred. However, higher and lower temperatures can be used.

For purposes of this invention, the amount of quench gas admitted is selected so that the desired energy balance (cooling) and proper mixing are both achieved. The size of the inlet used to introduce quench into the freeboard is selected so that the quench gas velocity results in appropriate penetration of gases in the freeboard, and the required mixing of these gases with the quench gas. The quench gas can be introduced at a slight positive pressure; however, the pressure utilized is not critical.

The quench gas is selected from a variety of applicable gases. Hydrogen, helium, argon and neon and mixtures thereof are illustrative. Preferably, the quench and carrier gas are the same so that they do not have to be separated before being recycled. Hydrogen is a preferred quench gas since it is preferably employed as a carrier gas. Moreover, when silane is used as the source of silicon the deposition process is a net producer of hydrogen.

As indicated above, the process of this invention comprises adding a quench gas at one temperature to the exiting gas at another temperature. The amount of temperature reduction achieved depends on the relative amounts of materials in the final mixture, the specific heats of the mixture components, and the temperatures of the gases that are mixed.

As a first approximation of the equilibrium temperature achieved by mixing two gaseous components, a skilled practitioner can use the energy balance relationship:

$$T_{eq} = \frac{T_1 m_1 C_{p1} + T_2 m_2 C_{p2}}{m_1 C_{p1} + m_2 C_{p2}}$$

wherein:
$T_{eq}$=equilibrium temperature,
$T_1$=temperature of the first component,
$T_2$=temperature of the second component,
$CP_1$ and $CP_2$=the specific heats of the two components, respectively, and
$m_1$ and $m_2$=the masses of the two components, respectively.

A skilled practitioner will recognize that this equation assumes ideal conditions that will be difficult to achieve under operation conditions. For example, the equation assumes there are only two components; and there will be at least three, even if the carrier gas and the quench gas are the same, e.g. hydrogen. For example, in preferred embodiments of this invention there will be silane, hydrogen and silicon fines. Since the fines are in a finely divided, solid phase, this introduces a factor not considered by the above equation. Furthermore, the equation is based on the presumptions of use of a static system, with homogeneous mixing forming a mixture of gases which is allowed to come to temperature equilibrium, without a temperature gain or loss caused by the outside or enclosing environment. In this. invention however, the quench and exiting gases are in a nonstatic system, and less than uniform mixing may be achieved. Furthermore, the vessel walls will influence the gas temperatures, since heat is added to the reaction system, and heat can be transferred from the reaction vessel to (or from) the gases and components therein.

Nevertheless, the above equation is a useful tool. An operator can first define the gases to be used, e.g. hydrogen and silane in the deposition gas, and hydrogen as the quench gas. He next can select a temperature of the exiting gas. For silane, the temperature is typically in the range of 600°–700° C. From the concentration of silane in the exiting gas, the operator can calculate the specific heat of the gas entering the freeboard. From knowledge of the relationship of the rate of silane decomposition vs. temperature and silane concentration, the operator can estimate the amount of temperature reduction required to achieve a target reduction of silane decomposition and deposition in the freeboard. With this information and knowledge of the temperature of quench gas available, the operator can calculate the amount of quench gas needed.

With this information the operator can conduct the process, and measure the amount of silicon fines produced with and without use of the quench gas. After obtaining these results, he can, if necessary, change the process variables and/or the amount of quench gas and/or the temperature thereof, to achieve the desired reduced rate of silicon fines formation. The operator can then conduct the process using that set of conditions, and determine whether the operating regime confers a suitable reduction in the amount or number of undesired reactor wall growths.

The following examples illustrate the process of this invention.

EXAMPLE 1

For the process of this example, a fluidized bed reactor having an internal diameter of 14.5 inches was used. The bed height was between 6 and 7 feet, and contained about 228 kg of silicon particles. The particles had an average size of 328 microns, and a size range of about 75–700 microns. The freeboard above the fluidized bed was about 10–12' in height. In the freeboard, there was a pipe of about 1 inch in internal diameter axially oriented with the freeboard, and with the outlet orifice of the pipe about 3–4 feet above the fluidized bed. This pipe was used to introduce hydrogen quench gas into the freeboard. For the process, typical operating conditions were:

| | |
|---|---|
| silane feed rate | 50 lb/hour |
| silane in feed | 15.4 volume percent |
| average bed temperature | 627° C. |
| temperature of quench gas | ambient |
| flow rate of quench gas | 59 scfm of hydrogen |
| temperature of gas in freeboard after mixing with quench gas | ~ 400° C. |

When operating in this manner, the conversion of silane, i.e. the amount of silane that was thermally decomposed in the reactor to useful product, and unwanted by-products, was 60.3%. The quench gas was turned off, and 10 minutes thereafter, the conversion had increased to 82.6%. There was no significant change in either the bed temperature or the liner wall temperature profile, and this indicates much more undesirable product was formed in the freeboard in the absence of the quench. As stated, the increase in silane decomposition that occurred after stopping the quench did not result in an increase in the formation of useful product. Thus, the increased conversion resulted in a waste of silane. Stated another way, the quench conserved silane by virtually eliminating silane conversion in the freeboard. The improvement in yield afforded by use of the quench, was equivalent to 11.2 lbs of silane per hour.

EXAMPLE 2

As another illustration of the utility of this invention, two series of three runs each were conducted utilizing silane as a silicon source to test the utility of operation with quench gas. In the first series, each run comprised a fluidized bed process using silane decomposition to provide deposition of polysilicon on a bed of silicon particles. The total silane feed time in the runs was 439 hours. During the last run of the series, the quench flow rate was lowered from a typical value of 50–60 scfm of $H_2$, to 25–30 scfm. At the end of the run, the interior of the fluidized bed reactor was examined. Large growths were observed on the walls of the freeboard space in the top part of the reactor near the exit nozzle.

In the second series of three runs, the total silane feed time was 491 hours. In all three runs in the second series, the flow rate of quench gas was maintained in the range of 50–60 scfm. When the interior of the reactor was inspected after the series of runs was completed, no growths were observed on the walls at the top part of the reactor. These results indicate that 50–60 scfm gave adequate quench and 25–30 scfm did not. Furthermore, the ability to run for 491 hours without growth formation was a surprising result when compared to the prohibitive extent of growth formation that occurred before the quench concept was invented and employed.

The processes of the above example can be applied to other processes in which a halosilane such as trichlorosilane or dichlorosilane is utilized as the silicon source. When using dichlorosilane the bed temperature is about 800°–900° C. When using trichlorosilane, the bed temperature is from about 1000°–1100° C.

Likewise, the process of this invention can be extended to fluidized bed processes in which silane is used as a silicon source and hydrogen or helium as a carrier gas, such that the concentration of silane in the mixture is about 1–20 mole %. With such processes, the bed temperature is 620°–650° C. The flow rate of such deposition gases defined by a $U/U_{min}$ ratio is from about 1.5 to 3.5.

With regard to the flow rate of quench gas, a skilled practitioner will recognize that there is no real upper limit on the amount of quench gas that can be introduced. Up to a point, as more gas is added, the better the mixing achieved, and the cooler the mixed temperature. Even more quench gas can be used, if desired. However, as the flow rate in the freeboard increases, there is an increased tendency for larger and larger particles to become entrained in the gas flow, and swept from the reactor. Therefore, the amount of quench gas introduced depends on the size of the particles that are to remain in the reactor. Therefore, the flow rate of the combined gases in the freeboard is selected so as not to exceed the terminal velocity of particles having the desired minimum size. Using quench gas at ambient temperature, good results were achieved when the flow rate of quench gas was within the range of 25–100% of the flow rate of deposition gas.

In the Examples above, the quench gas utilized was at ambient temperature. With regard to the temperature of the quench gas, it is to be understood that the quench is to reduce a gas temperature above about 600° C. Hence not only can temperatures at or below ambient be used, but a quench gas having a temperature considerably above ambient, say as high as 200° C. or higher, is somewhat effective. Thus, any quench gas temperature below the decomposition temperature of silane or other silicon source can be employed. Generally speaking, ambient temperature is satisfactory and preferred, but if desired, the quench gas can be cooled, say down to about −20° C. or lower. As indicated, temperatures of up to about 200° C. or higher can also be used. The temperature of the quench gas to be used will have an effect on the amount and flow rate of the quench. If a lower temperature is used, less quench gas can be employed.

With the above detailed description of this invention a skilled practitioner can make many changes or modifications without departing from the scope and spirit of the appended claims.

I claim:

1. A fluidized bed process for the preparation of polysilicon, said process comprising
   (i) fluidizing a bed of silicon particles, within a reactor having a bed zone for said particles and a freeboard above said bed zone, with a motive stream of deposition gas comprising a silicon source, said bed zone being at a temperature above the thermal decomposition temperature of said silicon source, whereby a portion of said silicon source is decomposed in said bed zone to deposit silicon metal on said bed of silicon particles, and a remaining portion of said silicon source exits said bed zone and enters said freeboard, and
   (ii) introducing a flow of quench gas at a temperature below about 200° C. into said freeboard above the upper boundary of said bed zone, said flow of quench gas being sufficient to reduce the temperature and concentration of said silicon source in said freeboard, and thereby reduce the amount of decomposition of said silicon source in said freeboard.

2. The method of claim 1, wherein said silicon source is silane.

3. The method of claim 2, wherein the temperature within said bed zone is from about 620° to about 650° C.

4. The method of claim 3, wherein the flow rate of said motive stream of deposition gas has a $U/U_{min}$ ratio of from about 1.5 to about 3.5.

5. The method of claim 4, wherein said quench gas is at ambient temperature and the amount of quench gas introduced into said freeboard is sufficient to reduce the temperature of gas within said freeboard to at least about 400° C.

6. The method of claim 5, wherein said quench gas is selected from the class consisting of hydrogen, helium, argon, and neon, and mixtures thereof.

7. The method of claim 6, wherein said quench gas is hydrogen.

8. The method of claim 1, wherein the flow rate of quench gas is within the range of 25–100 percent of the flow rate of deposition gas.

9. The method of claim 1, wherein the bed particles after silicon deposition have a $d_{ps}$ of 300–2000 microns.

10. The method of claim 9, wherein said particles have a $d_{ps}$ of from about 600 to about 800 microns.

11. The method of claim 1, wherein said silicon source is selected from the class consisting of silane, monochlorosilane, dichlorosilane, trichlorosilane, and tetrachlorosilane.

12. The method of claim 11, wherein said silicon source is dichlorosilane and the temperture within said bed zone is about 800°–900° C.

13. The method of claim 11, wherein said silicon source is trichlorosilane and the temperature within said bed zone is from about 1000°–1100° C.

* * * * *